United States Patent [19]

Nelson

[11] 4,289,657

[45] Sep. 15, 1981

[54] FLUID TREATMENT DEVICES

[75] Inventor: Richard S. Nelson, Goring-on-Thames, England

[73] Assignee: United Kingdom Atomic Energy Authority, England

[21] Appl. No.: 85,754

[22] Filed: Oct. 17, 1979

[30] Foreign Application Priority Data

Oct. 27, 1978 [GB] United Kingdom ............... 42175/78

[51] Int. Cl.³ ...................... B01J 35/00; B01D 47/00; B01J 8/00; B05D 5/12
[52] U.S. Cl. ................................ 252/477 R; 423/212; 423/659; 427/116; 427/372.2; 427/346
[58] Field of Search ............... 252/477 R; 261/94, 95; 422/312, 177, 211, 222; 427/346, 116, 372.2; 423/212, 213.2, 213.5, 239, 659

[56] References Cited

U.S. PATENT DOCUMENTS

| 2,332,110 | 10/1943 | Podbielniak | 261/94 |
| 2,526,657 | 10/1950 | Guyer | 252/477 R X |
| 3,362,783 | 1/1968 | Lock | 256/477 R X |
| 3,391,910 | 7/1968 | Prahl | 261/94 |
| 3,867,313 | 2/1975 | Brewer | 423/213.5 X |
| 4,096,095 | 6/1978 | Cairns | 423/213.5 X |

FOREIGN PATENT DOCUMENTS 425424  7/1926  Fed. Rep. of Germany ........ 261/94

*Primary Examiner*—Michael R. Lusignan
*Attorney, Agent, or Firm*—Larson and Taylor

[57] ABSTRACT

A device for the treatment of fluids in which the fluid is caused to contact the device. The device is particularly useful in the field of catalysis. The device comprises a plurality of substantially parallel elongate helically wound coils of wire connected together by a connecting member to form a sheet of interconnected coils. In the case where the device is used for the treatment of the fluid by catalysis, the wire is made from, or coated with, a catalytically active material.

9 Claims, 5 Drawing Figures

FLUID TREATMENT DEVICES

This invention relates to devices for use in the treatment of fluids by interaction with a solid surface such as catalyst devices.

U.K. Pat. No. 2,000,045A which corresponds to U.S. patent application Ser. No. 916,561 (filed 19th June 1978) and to West German OLS No. 2 862 843 discloses, in a specific embodiment, a particular form of supported catalyst where the substrate is a wire form wound in to a helical coil with its windings extending progressively along a common axis. A number of important advantages follow from making catalyst supports in this way. In particular, wide ranging adjustment of important parameters such as exposed surface area, resistance to fluid flow, mass and heat conducting properties of the substrate can be achieved, without the constraint normally imposed by difficulties of coating a wire configuration substrate by contact with material dispersed in a liquid medium. Further, using a metallic substrate, a high degree of high temperature corrosion resistance can be achieved so that, for example, a substrate of aluminium bearing ferritic alloy without an yttrium addition can give satisfactory performance and durability in the severe environment of a motor vehicle exhaust system.

We have further appreciated that these advantages, whilst of principal significance in the manufacture and use of supported catalysts for satisfactory performance and durability in the catalytic purification of exhaust gases from motor vehicles, also have significance in any system (whether employing catalysis or not) where fluids are to be treated by passage over, and interaction with, a solid surface, and control of the above mentioned parameters is important. Examples of other such systems where devices constructed in accordance with the present invention may be useful are in chromatographic separations, and processes where the solid surface material has an affinity for a constituent of the fluid flowing over it and is employed to separate out that constituent from the fluid.

In a first aspect, the present invention provides a device for use in the treatment of a fluid by passing the fluid over a solid surface with which the fluid interacts, which device comprises a plurality of elongate helically wound coils of wire-form arranged with their longitudinal axes substantially parallel to one another and interconnected by a connecting member to form a sheet of interconnected coils.

Preferably the space between adjacent windings of each coil is less than the diameter of the wire-form. Each coil may be fabricated in a helical configuration from corrugated wire-form. The corrugation may be superimposed along the length of the wire-form so that, in each winding of the coil, the space between adjacent parts of the wire-form varies as a consequence of the corrugation. The pitch of the corrugation may be arranged in relation to the diameter of the coil and the pitch of the winding of the coil so that the peaks of the corrugation in each winding occur adjacent a peak in the next succeeding winding of the coil.

The preferred use of the device is in the treatment of a fluid by catalysis; in this case at least a surface of the coils comprises a catalytically active material. For example, each coil may be made of a catalytically active material or may carry a coating of catalytically active material. In a particular embodiment, one or more, but not all, of the coils may carry a coating of a first catalytically active material and the remaining coils may carry a coating of a different catalytically active material.

The sheet of coils may be assembled to form a fluid permeable body through which the fluid to be treated can flow in contact with the surfaces of the coils. One or more sheets of interconnected coils may be laid (folded or wound) on to itself, or on to other such sheets of interconnected coils, to form the fluid permeable body through which the fluid to be treated can flow in contact with the surface of the, or each, coil.

Preferably the wire-form is made of an aluminium bearing iron base alloy (available in the U.K. under the U.K. Registered Trade Mark FECRALLOY). Such a metal alloy suitable for use in the present invention may be found within the alloy specification of a composition by weight of 10 to 30% Cr, 1 to 10% Al, 0 to 0.5% C, and the balance Fe.

Where resistance to high temperature embrittlement is important such alloys are made within the specification of a composition by weight of up to 20% Cr, 1 to 10% Al, 0.1 to 3.0% Y and the balance Fe. Where a degree of high temperature embrittlement can be tolerated, as for example where a helical coiled wire configuration is employed, higher chromium content up to 25% by weight may be employed. The particularly preferred composition is a FECRALLOY (Registered Trade Mark) alloy having 15.50 to 16.50% Cr, 4.6 to 5.6% Al, 0.3 to 1.0% Y and the balance Fe.

The above mentioned alloys may include additions of Co and/or Ni and it is envisaged that such inclusions should be limited to the range 0 to 3% by weight of each element. However, acceptable performance may be achieved with these additions in the range 0 to 5% Co, and 0 to 5% Ni.

An alternative alloy is that sold under the U.K. Registered Trade Mark KANTHAL DSD. A typical example of such an alloy has an appropriate composition by weight of 22.5% Cr, 4.5% Al, 2.0% Co, 0.1% C and the balance Fe.

Preferably the aluminium bearing alloy has a ceramic layer on its surface. Preferably the ceramic material is bonded to the surface of the wire-form by heat treatment. The ceramic material may, for example, be silica or a refractory metal oxide such as alumina, ceria and yttria. The preferred ceramic material is alumina, which is bonded to the wire-form by heat treatment.

Preferably heat treatment, either before or after or both before and after coating with the porous ceramic, is carried out in the presence of oxygen to form a substantially alumina layer on the surface of the alloy wire form from aluminium within the alloy.

Catalytically active material, when required, may be deposited upon a plurality of coils which are then assembled together to form the sheet of interconnected coils. The catalytically active material may be deposited either after pre-coating of the substrate alloy with porous ceramic material or may be deposited simultaneously with the porous ceramic material.

There are many ways of applying the catalytically active materials to a substrate such as, for example, sputtering techniques using gaseous discharge, plasma coating techniques, flame spraying techniques, wash coating techniques, vapour deposition techniques, and sintering techniques. The preferred way of depositing a catalyst onto the coils is that described in our U.K. patent application No. 43435/75 which corresponds to U.S. patent application Ser. No. 733,152 (filed 18th Oct.

1976), now abandoned, and to West German OLS No. 26 47 702.

In a second aspect the invention provides a method of manufacturing a device for use in the treatment of a fluid which comprises
  (i) arranging one or more elongate helically wound coils of wire with their longitudinally axes substantially parallel to one another and interconnecting the coils with a connecting member to form a sheet of interconnecting coils; and
  (ii) providing at least a surface of the coils with a catalytically active material.

Preferably step (ii) comprises coating the coils with a dispersion containing the catalytically active material or a precursor therefor, thereby to coat the wire-form with the dispersion, ensuring that the whole extent of the surface of the coils to be coated is contacted by the dispersion, and heat treating to provide the coils with a coating containing the catalytically active material.

The preferred method of carrying out the above coating comprises contacting the coils as a batch with the dispersion, removing the batch from contact with the liquid dispersion, removing excess liquid by shaking which causes relative movement between the discrete coils and thereby frees excess liquid trapped by surface tension effect at points of contact between adjacent coils, and drying.

In a third aspect the invention provides a method of treating a fluid by catalysis comprising the steps of causing the fluid to flow through a catalyst device which comprises a plurality of elongate helically wound coils, at least the surface of which comprises a catalytically active material interconnected by a connecting member to form a sheet of interconnected coils and fabricated into a fluid permeable body through which the fluid in contact with the surface of the, or each, coil.

Preferably, the fluid comprises the exhaust gases of an internal combustion engine.

Embodiments of the invention will now be described, by way of example only, with reference to the accompanying drawings in which.

In the following embodiments of the invention the final product is to be used for the treatment of the exhaust gases of internal combustion engines by catalysis. It is to be understood however that the catalyst devices of the present invention may be useful in other industrial processes requiring supported catalytically active material.

Figure 1:
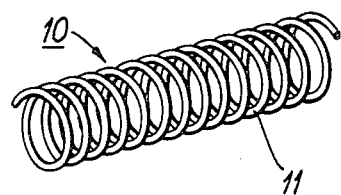
FIGS. 1, 2 and 4 illustrate three types of coils for use in a catalyst device constructed in accordance with the present invention.

Referring to FIG. 1, there is shown a helical coil 10 made from a 0.040 ins (1.0 mm) diameter circular section wire 11 wound along an axis to form a coil which measures 3.0 ins (76.2 mm) long×0.25 ins (6.4 mm) outside diameter. The pitch of the windings is approximately 0.039 ins (1.0 mm).

The wire is made of "FECRALLOY" alloy (U.K. Registered Trade Mark) having a composition (by weight) of 4.6 to 5.6% Al, 15.50 to 16.50% Cr, 0.3 to 1.0% Y, and the balance Fe. A predominantly alumina layer is formed on the surface of the wire and catalytically active material is deposited on the alumina layer as described in our U.K. patent application No. 43435/75 which corresponds to U.S. patent application Ser. No. 733,152 (filed 18th Oct. 1976) and to West German OLS No. 26 47 702. In a particular example described in the specification accompanying the latter mentioned applications and suitable for use in manufacturing catalyst devices of the present invention, alumina, prepared by a vapour condensation method, is formed into a sol by admixture with water and the sol mixed with a solution of yttrium nitrate in water to form a "mixed sol". A platinum salt is added to the mixed sol to give a dispersion which is applied to a preoxidised FECRALLOY alloy substrate. The thus coated substrate is subsequently fired to provide a coating containing platinum as the catalytically active material. Other techniques of applying a catalyst to the coil 10 may be used.

Figure 2:
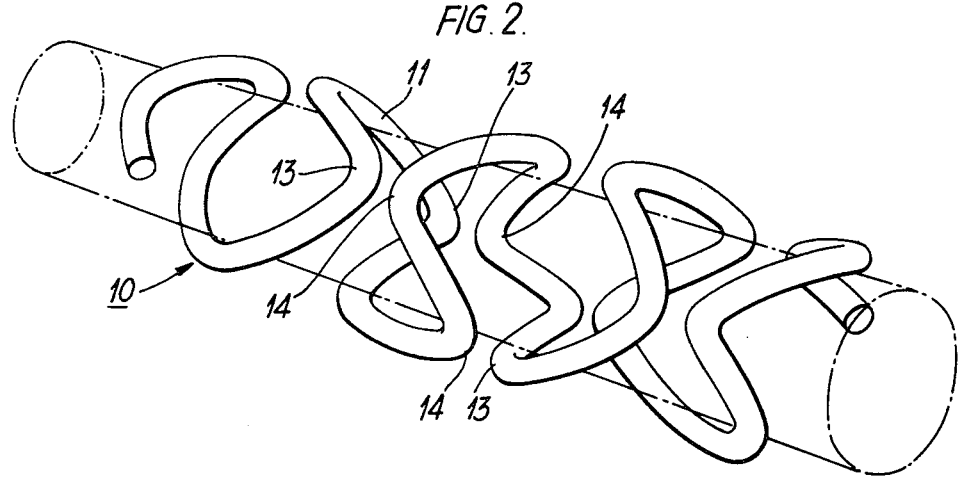
Figure 3:
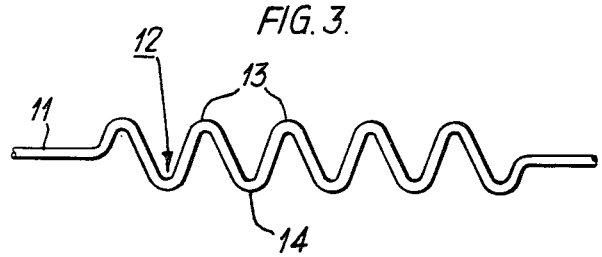
FIG. 3 illustrates the wire-form used to produce the coil of FIG. 2.

Referring to FIG. 2 there is shown an alternative coil manufactured from the same type of alloy wire 0.02 ins (0.5 mm) diameter and wound into a coil 0.125 ins (3.0 mm) diameter by 1.5 ins (40 mm) long with a pitch of 0.11 ins (2.8 mm). The wire, used to make the coil 10 of FIG. 2 is shown in FIG. 3. From FIG. 3 it will be seen that the wire 11 has superimposed along its length a corrugation 12 prior to it being wound into a coil. The corrugation 12 has a pitch of typically 0.13 ins (3.5 mm) and the dimension measured from peak to peak 14 is typically 0.04 (1.0 mm). The corrugations 12 imparts strength to the thin wire 11 and also if the peak 13, 14 of the corrugation 12 of each winding are arranged to coincide with peaks 13, or 14 in the next adjacent winding serve to prevent nesting of adjacent coiled members. Here again a surface coating and a catalytically active material is applied to the wire 11 in exactly the same way as described in connection with FIG. 1.

The coils shown in FIGS. 1 and 2 may be of uniform pitch as shown in FIGS. 1 and 2 or the pitch may vary along the length of the coil as shown in FIG. 3. In the case of the coil shown in FIG. 2, the pitch of the corrugations may be altered so that the peaks 13, 14 of each winding coincide.

Figure 4:
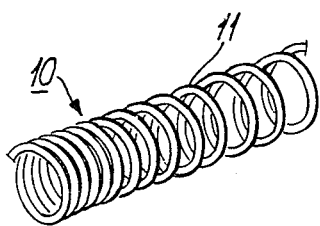
Figure 5:
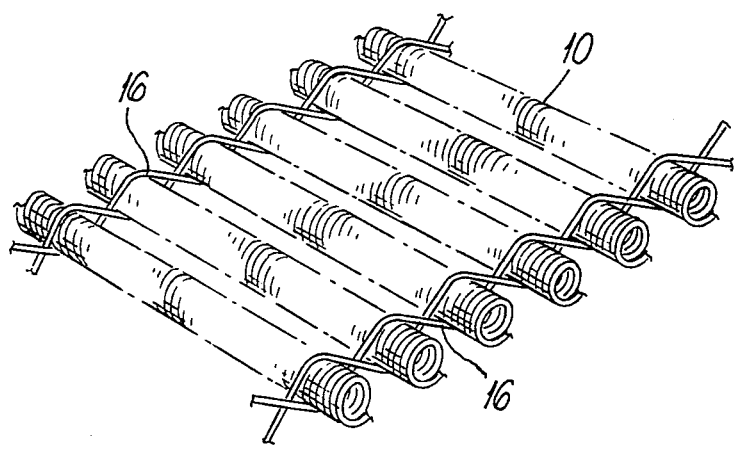
FIG. 5 illustrates a catalyst device according to the present invention made from a number of coils of the type shown in FIGS. 1, 2 or 4, interconnected to define a sheet of interconnected coils.

Referring to FIG. 5 a plurality of coils 10 made in the form as shown in any one of FIGS. 1, 2 or 4 are assembled with their longitudinal axes extending substantially parallel to one another. The coils 10 are connected together to form a sheet of interconnected coils by two pairs of wires 16. The wires are woven or platted around each coil 10. This is to say, each wire passes successively over and under adjacent coils 10. The coils may touch along their length or be spaced apart.

A continuous length of a sheet of interconnected coils 10 as illustrated in FIG. 5, may be laid or wound on itself to form a catalyst device. For example, a catalyst device may be formed by winding the sheet of interconnected coils 10 spirally onto itself or onto a spool or former to produce one or more layers. Alternatively, the catalyst device may be formed by laying the sheet of interconnected coils onto itself in a zig-zag way or by laying two or more discrete sheets of interconnected coils onto each other to define a fluid permeable body.

Preferably the coils 10 have a surface coating and catalytically active material applied to them prior to assembly into a sheet of interconnected coils. In some cases it may be possible to coat them after they are assembled into the sheet of interconnected coils 10.

The diameter of the wire 11 and size of the coils 10 (i.e. length, diameter and pitch of the coil) may be varied to suit any particular process. In particular, these parameters can be varied to meet desired pressure-drop specifications for the intended use of the catalyst device. By varying these parameters one effectively varies the total effective area available to support a catalyst.

Preferably the cross-sectional shapes of the bore of the coils is a circle, although it may be of any desired shape, such as for example, triangular, rectangular, or polygonal achieved by winding the wire-form helically along a suitably shaped former. The terms "helical" and "helically" as used herein is taken to embrace coils wound along an axis irrespective of the shape of the bore of the coil. The coils may be formed on a conventional spring winding machine. The coils may be of uniform diameter or tapered if desired.

It is preferred to make the wire-form of a metal, for example steels; refractory metal carbides, for example WC, TiC, TaC; aluminium and aluminium alloys, stainless steels and stainless irons. The wire-form may be drawn wire or an extruded rod.

It may be possible in some instances to use a ceramic filamentary member, although it is thought that such a route of manufacture would not be as easy as producing the components from metal wire, because of the need to fabricate the components in a green (plastic) state and then fire them to produce the final form.

Catalyst devices constructed according to the present invention are useful in the treatment of exhaust gases of internal combustion engines by catalysis and in particular for trapping and treating soot products in the exhaust gases of diesel engines by catalysis, and the catalytic reduction of nitrogen oxides and catalytic oxidation of hydrocarbons and carbon monoxide in engine exhaust gases.

An important advantage that results from making the catalyst devices in the form of a number of coils in accordance with the present invention is that one can apply different catalytically active materials to different coils if one so desires. For example, one can construct a composite catalyst device using two or more sets of identical coils assembled to form the sheet of interconnected coils with different catalytically active materials deposited on each set of coils. For example a catalyst device may be constructed with some of the coils carrying one metal from the platinum group of metal (platinum, osmium, iridium, palladium, rhodium, ruthenium) whilst the others carry a different metal from the platinum group.

In a specific example, a catalyst device constructed in accordance with the present invention for the treatment of exhaust gases of an internal combustion engine by catalysis may have some coils coated with platinum and the others coated with rhodium. In the past it has been usual to put down the platinum and rhodium as a common coating with platinum sites closely adjacent the rhodium sites. We have observed that after prolonged use the platinum becomes less effective at catalysing the oxidation of the hydrocarbons. Examination of the surface of the catalyst reveals that active platinum sites are lost, but we have found that this loss does not occur to the same extent when the rhodium and platinum are deposited on separate coils.

Tests involving the oxidation of propane were carried out by flowing a slug of propane/oxygen carried in a nitrogen stream over two types of supported catalyst. One supported catalyst was a Pt/Rh mixed catalyst on a ceramic coated FECRALLOY alloy substrate (shown as Catalyst A below), the other comprised separate Pt and Rh catalysts on separate coiled members made of ceramic coated FECRALLOY alloy assembled to constitute a common catalyst (shown as Catalyst B below). The catalyst volume was displaced 100,000 times per hour by the propane/oxygen slug. The results are shown below.

| Type of supported catalyst (see text) | Temperature required for 100% oxidation of propane | |
|---|---|---|
| | New catalyst | Catalyst after heating in air at 1,000° C. for 12 hours |
| A | 350° C. | 500° C. |
| B | 400° C. | 400° C. |

It is thought that the problem of the deterioration of the efficiency of the platinum as a catalyst may also apply to the commercial production of nitric acid from ammonia where platinum and rhodium are used as the catalysts. Therefore a catalyst bed made up of two sets of coils, each set of which either carries platinum or rhodium may be useful in the production of nitric acid.

The present invention may of course be useful in a wide variety of chemical processes involving treatment of fluids by interaction with a solid surface.

I claim:

1. A device for use in the treatment of a fluid by catalysis which comprises one or more sheets of interconnected coils laid up to give more than one layer of coils, said layers being in touching contact with one another, the or each sheet comprising a plurality of elongate helically wound coils of wire-form wherein the space between adjacent windings of each coil is less than the diameter of the wire-form and wherein each coil carries a coating of catalytically active material, the coils being arranged with their longitudinal axes substantially parallel to one another and being interconnected by a connecting member to form a sheet of interconnected coils.

2. A device according to claim 1 wherein each coil is fabricated in a helical configuration from corrugated wire-form.

3. A device according to claim 2 wherein the corrugation is superimposed along the length of the wire-form so that, in each winding of the coil, the space between adjacent parts of the wire-form varies as a consequence of the corrugation.

4. A device according to claim 3 wherein the pitch of the corrugation is arranged in relation to the diameter of the coil and the pitch of the winding of the coil so that the peaks of the corrugation in each winding occur adjacent a peak in the next succeeding winding of the coil.

5. A device according to claim 1 wherein one or more, but not all, of the coils carry a coating of a first catalytically active material and the remaining coils carry a coating of a second and different catalytically active material.

6. A device according to claim 1 wherein the wire-form is made of an aluminium bearing iron base alloy.

7. A device according to claim 6 wherein the alloy has a composition by weight of 10 to 30% Cr, 1 to 10% Al, 0 to 0.5% C, and the balance Fe.

8. A device according to claim 7 wherein the alloy has a composition by weight of up to 25% Cr, 1 to 10% Al, 0.1 to 0.3% Y and the balance Fe.

9. A device according to claim 7 wherein the aluminium bearing alloy has a ceramic layer on its surface.

* * * * *